United States Patent
Yamane et al.

(10) Patent No.: US 8,119,699 B2
(45) Date of Patent: Feb. 21, 2012

(54) METHOD OF RECYCLING LAMINATED MOLDING

(75) Inventors: Kazuyuki Yamane, Fukushima-Ken (JP); Ryo Kato, Fukushima-Ken (JP); Akiko Wakamatsu, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 989 days.

(21) Appl. No.: 10/579,560

(22) PCT Filed: Nov. 11, 2004

(86) PCT No.: PCT/JP2004/017107
§ 371 (c)(1),
(2), (4) Date: May 16, 2006

(87) PCT Pub. No.: WO2005/049710
PCT Pub. Date: Jun. 2, 2005

(65) Prior Publication Data
US 2007/0095957 A1    May 3, 2007

(30) Foreign Application Priority Data
Nov. 21, 2003    (JP) .................................. 2003-392497

(51) Int. Cl.
C08J 11/04    (2006.01)
B08B 9/20    (2006.01)
B02C 17/00    (2006.01)
B29D 22/00    (2006.01)

(52) U.S. Cl. ...... 521/40; 428/35.7; 134/25.1; 241/24.12
(58) Field of Classification Search ............... 241/24.12; 264/918; 521/40
See application file for complete search history.

(56) References Cited

U.S. PATENT DOCUMENTS

| | | | |
|---|---|---|---|
| 5,395,858 A * | 3/1995 | Schwartz, Jr. .................. | 521/48 |
| 5,594,076 A * | 1/1997 | Gordon et al. ................. | 525/444 |
| 5,958,987 A | 9/1999 | Schwartz, Jr. et al. | |
| 6,001,439 A | 12/1999 | Kawakami et al. | |
| 6,031,128 A * | 2/2000 | Roh et al. ....................... | 562/483 |
| 6,090,860 A * | 7/2000 | Peters et al. .................... | 521/48 |
| 6,649,792 B2 | 11/2003 | Sirek et al. | |
| 6,673,403 B1 * | 1/2004 | Shiiki et al. .................. | 428/35.7 |
| 2001/0020483 A1 * | 9/2001 | Yamaguchi et al. .......... | 134/187 |
| 2002/0123546 A1 * | 9/2002 | Bigg et al. ..................... | 524/306 |

FOREIGN PATENT DOCUMENTS

| | | |
|---|---|---|
| DE | 100 32 900 A1 | 1/2002 |
| EP | 0 589 642 A | 3/1994 |
| EP | 1 555 209 A | 7/2005 |
| JP | 10-337772 | 12/1998 |
| JP | 11-209509 | 8/1999 |
| JP | 2000-94547 | 4/2000 |
| JP | 2003-527363 | 9/2003 |
| WO | 01/55250 A | 8/2001 |
| WO | 03/097468 | 11/2003 |

OTHER PUBLICATIONS

Supplementary European Search Report issued Dec. 14, 2009 in corresponding European Application No. 04799721.8.

* cited by examiner

*Primary Examiner* — Christina Johnson
*Assistant Examiner* — Michael Piery
(74) *Attorney, Agent, or Firm* — Wenderoth, Lind & Ponack, L.L.P.

(57) ABSTRACT

A method of recycling a laminate shaped product, including the steps of: breaking a shaped product having a laminate structure including at least one layer of aliphatic polyester resin in addition to a principal resin layer, storing resultant broken pieces in a moisturizing environment to adjust a moisture content of the aliphatic polyester resin (layer) to at least 0.5 wt. %, and then washing the broken pieces with alkaline water to remove the aliphatic polyester resin layer, thereby recovering the principal resin. As a result, it becomes possible to shorten an induction period in the alkaline water washing step that is a principal process step, thereby rationalizing the entire process.

11 Claims, No Drawings

METHOD OF RECYCLING LAMINATED MOLDING

This application is a U.S. national stage of International Application No. PCT/JP2004/017107 filed Nov. 11, 2004.

TECHNICAL FIELD

The present invention relates to a method of recycling (a principal resin of) a laminate shaped product or laminated molding, particularly a bottle, including a layer of an aliphatic polyester resin, particularly a glycolic acid polymer, in addition to a layer of a principal resin. Herein, the term "bottle" refers not only to a bottle in its narrow or ordinary sense having a small size of mouth or neck relative to its internal volume but also refers to a (hollow) shaped container in general for containing content materials therein. It is believed readily understandable from the following description that the effect of the present invention is not restricted by a strict shape of shaped products or containers.

BACKGROUND ART

Needless to say, resin-made shaped products are adopted for a wide variety of uses in modern societies. In case where required properties are not satisfied with a single resin, laminar or laminated products of plural resins have been used. Among these, resin-made bottles are used widely and in large masses as containers for various liquid materials, such as drinking water, seasonings, edible oil, alcoholic beverages, fuels, and detergents, because of their lightness, transparency allowing seeing therethrough of the content materials, etc. This particularly holds true with so-called "PET bottles" made of polyester resins, especially bottles made of PET (polyethylene terephthalate).

However, in view of town problems nowadays including the demands for reducing the load to the environment and reducing the garbage, the recycling of such resin-made products, particularly bottles, used in large masses has been demanded. As for the manner of recycling, various types are present, including a heat energy recovery type through combustion, a chemical recycle type of recycling to monomers, a starting material type of recycling to a starting resin material through pulverization and refining steps, and a returnable type for re-utilization as bottles. In the case of PET bottles among others, the starting material-type of recycling to the starting resin material through pulverization and refining steps is frequently adopted, and the recovered resin material is re-utilized for producing fiber products, etc., in many cases.

On the other hand, nowadays, also bottles are required to suppress the transmission therethrough of carbon dioxide gas or oxygen gas for improving the preservability of contents therein. For achieving the improvement, there has been proposed, e.g., a multiple layer structure of providing a gas barrier coating or disposing a gas barrier resin layer as an intermediate layer. This requirement is particularly critical for bottles having a volume of 500 ml or less.

In the case of a PET bottle provided with a multiple layer structure by disposing a gas barrier coating or an intermediate gas barrier resin layer, it is possible that the quality or safety of the recycled resin materials is questioned if it is difficult to sufficiently separate the PET resin material and other resin materials.

Further, it has been also tried to use colored PET bottles in order to prevent photodegradation of contents, such as beer, or achieve a design effect, but the utilization thereof has been restricted because it is liable to make difficult the recycling due to the problem of color mixing of the recycled resins.

DISCLOSURE OF INVENTION

An object of the present invention is to provide a method of recycling (a principal resin of) a laminate shaped product, particularly a bottle, which has a laminate structure including an additional resin layer in addition to a principal resin layer and is yet provided with excellent recyclability.

The present inventors have found it effective for accomplishing the above object to provide a layer of glycolic acid polymer as an additional resin layer and, based on the knowledge, have proposed a bottle excellent in recyclability and a method for recycling the bottle (WO-A 03/097468).

The present invention relates to an improvement in the above-proposed bottle recycling method.

More specifically, the bottle recycling method according to WO-A 03/097468 comprises the steps of: breaking a bottle having a laminate structure including at least one layer of glycolic acid polymer in addition to a principal resin layer, and washing broken pieces of the bottle with alkaline water, etc., to remove the glycolic acid polymer layer, thereby recovering the principal resin.

According to the present inventors' study, it has been found that the step of removing the glycolic acid polymer layer by washing with alkaline water involves an induction period and it becomes possible to remarkably shorten the step of removing the glycolic acid polymer layer including the induction period if the glycolic acid polymer layer is caused to contain a certain amount of water in advance thereof. This phenomenon is found not only for a glycolic acid polymer but also another aliphatic polyester resin, such as polylactic acid.

The method of recycling a laminate shaped product according to the present invention is based on the above findings, and comprises the steps of: breaking a shaped product having a laminate structure including at least one layer of aliphatic polyester resin in addition to a principal resin layer, storing resultant broken pieces in a moisturizing environment to adjust a moisture content of the aliphatic polyester resin (layer) to at least 0.5 wt. %, and then washing the broken pieces with alkaline water to remove the aliphatic polyester resin layer, thereby recovering the principal resin.

BEST MODE FOR PRACTICING THE INVENTION

As resins constituting another resin in addition to the principal resin layer in the method of the present invention, it is possible to use aliphatic polyester resins, inclusive of: polylactic acid, polycondensation products of alkylene glycols and alkylene dicarboxylic acids, polycaprolactone, and poly-γ-hydroxybutanoic acid, etc., but it is still preferred to use a glycolic acid polymer in view of hydrolyzability and gas-barrier property.

(Glycolic Acid Polymer)

As is also described in WO-A 03/097468, glycolic acid polymer is a hydrolyzable polyester having a recurring unit represented by a formula (1) below:

$$—(OCH_2CO)— \qquad (1)$$

It is preferred to use glycolic acid homopolymer (PGA) consisting only of the above recurring unit, but another recurring unit can be contained provided that a structure having a main chain which can be cut by hydrolysis is preferred. Preferable structures may include ester structures including carboxylic acid esters and carbonic acid esters, and amide structure. Particularly, an aliphatic ester structure is preferred because of easiness of hydrolysis. Examples thereof may include the following:

(2)

(3)

(4)

The proportion of such another recurring unit structure is below 50 wt. %, preferably below 30 wt. %, further preferably below 15 wt. %.

(Principal Resin)

As a principal resin forming the shaped product together with a layer of the aliphatic polyester resin, various species and grades of thermoplastic resins may be used, inclusive of polyesters as represented by PET (i.e., polyethylene terephthalate) and polyethylene naphthalate (PEN); polyvinyl chloride (PVC), polyethylene (PE), polypropylene (PP), polycarbonate (PC) and polystyrene (PS). As already mentioned before, glycolic acid polymer, when used as the aliphatic polyester resin, has a remarkably higher gas-barrier property than these general-purpose resins, and can form a bottle with an improved gas-barrier property in case of being laminated with any of these resins. Particularly, in view of the fact that PET bottles are dominantly used at present, it is preferred to use PET as a principal resin for the bottle from the viewpoint of economy and also energy consumption for the recovery and recycling.

It is possible to use a plurality of resins in mixture but this is liable to cause a lowering in quality when recycled, so that a single resin material is preferred. It is also possible to use a colored resin but this is liable to cause a lowering in quality due to color mixing when recycled, so that a neat resin is preferred.

It is possible that a small amount of aliphatic polyester resin is contained in the principal resin layer, but the content thereof should preferably be at most 10 wt. %, further preferably at most 3 wt. %, most preferably at most 1 wt. %. Such a principal resin layer containing an aliphatic polyester resin is generally found in the case where the principal resin layer is formed of a recycled resin layer comprising the principal resin and an aliphatic polyester resin, etc. If a resin material substantially free from aliphatic polyester resin is desired to be recovered, it is preferred to use a principal resin free from aliphatic polyester resin.

(Laminate Structure)

The aliphatic polyester resin layer is preferably formed as an intermediate layer sandwiched between an outer layer and an inner layer composed as principal resin layers forming the bottle. The intermediate layer may be formed in a single layer or plural layers. The formation ratio between the inner and outer layer resin and the aliphatic polyester resin may be arbitrarily determined depending on a performance and a quality desired of the bottle. Particularly, in the case where a glycolic acid polymer is used as an aliphatic polyester resin to provide a shaped product in the form of a bottle, the weight ratio (substantially corresponding to a layer thickness ratio) between the principal resin and the glycolic acid polymer is preferably in the range of 99/1-55/45, particularly 98/2-80/20, in order to provide a good recycle efficiency of the principal resin while imparting a good gas-barrier property. Incidentally, it is preferred that the glycolic acid polymer layer is formed in a thickness of at least 3 μm so as to exhibit a good gas-barrier property. The thickness should preferably be retained in the body or trunk portion which occupies a major area of a bottle and, in some cases, the glycolic acid polymer layer can be not present at the bottom or neck portion. Further, in some cases, it is possible to include a recovery resin layer comprising a mixture of the principal resin and the glycolic acid polymer, and in such a case, the content of glycolic acid polymer in the recovery resin layer should preferably be at most 50 wt. %, further preferably at most 30 wt. %, most preferably at most 10 wt. %. If it is desired to recover a resin material substantially free from glycolic acid polymer, it is preferred that the recovered resin layer does not contain glycolic acid polymer. Incidentally, examples of the laminate layer structure in the case of including a recovery resin layer may include: principal resin/recovery resin/aliphatic polyester resin/principal resin, principal resin/aliphatic polyester resin/recovery resin, etc.

It is possible to insert an adhesive resin, as desired, e.g., between the principal resin layer and the aliphatic polyester resin layer, but it is preferred not to insert such a layer if it obstructs the recyclability.

(Recycling Method)

Bottle recycling has been actually performed with respect to PET bottles. In such a system, after washing and selective removal of other resin items (such as caps and PVC-made bottles), PET bottles are broken or cut, washed with alkaline water and recovered as PET resin.

It is preferred that also the shaped products, such as bottles, are recycled according to the present invention through recycling steps similar to those in the above-mentioned PET bottle recycling system.

However, in the method of the present invention, preceding the step of washing a laminate shaped product, such as a bottle, with an alkaline water, broken pieces of the laminate shaped product are stored in a moisturizing environment to adjust the moisture content of the aliphatic polyester resin layer to a level of at least 0.5 wt. %, preferably at least 1.0 wt. %. Moisturization can also be effected by placing the broken pieces of the laminate shaped product in a high-humidity air environment, but the immersion in water is more convenient. The moisturization may possibly be effected by storing under a moisturizing condition even in a state before the breaking, but the moisturization after the breaking is more reliable and efficient. The time required for the moisturization may depend on the species of aliphatic polyester resin and the environmental temperature, but a moisture content of 0.5 wt. % may be achieved in 1 hour, and a moisture content of 1.0 wt. % in 2 hours or longer. The moisturization requiring such a time can be performed after a step of breaking or pulverization of the laminate shaped product which is generally performed immediately after introduction into a processing factory and within a time frame of awaiting the alkaline water-washing step. As a result, the processing time in the alkaline water-washing step which is a dangerous step using high-temperature alkaline water, can be reduced.

The broken pieces of laminate shaped product including the aliphatic polyester resin layer of which the moisture content has been adjusted to at least 0.5 wt. %, preferably 1 wt. % or higher, in the above-described manner are subjected to washing with alkaline water. The washing with alkaline water may be performed by using an alkaline washing liquid of 0.01-5 normal, preferably an aqueous caustic soda solution of which the concentration has been adjusted to 1-3 wt. %, at a temperature of 20-100° C., preferably 70-98° C., particularly preferably 70-90° C.

The washing may be performed either as a batchwise operation or a continuous operation. In any case, it is preferred to retain the alkalinity of the washing throughout the washing step in order to efficiently perform the washing. More specifically, as the alkali is consumed due to the hydrolysis of the aliphatic polyester resin during the washing, it is preferred to supply alkaline water containing an amount exceeding an equivalent amount (i.e., 1 mol (e.g., 40 g in case where the alkali is caustic soda) for 1 mol of recurring unit of the aliphatic polyester resin (e.g., 58 g for the recurring unit of polyglycolic acid represented by the formula (1) mentioned before) in the laminate shaped product. Further, from the viewpoint of effective removal by washing of the aliphatic polyester resin and maintaining an effect of alkaline washing of the principal resin after removal of the aliphatic polyester resin, it is preferred to supply alkaline water containing an excessive amount of alkali, more specifically, at least 1.5 equivalents, further preferably 2 equivalents or more, of alkali.

In the case where the amount of aliphatic polyester resin contained in the laminate shaped product to be washed (i.e., the weight of laminate shaped product×the content of aliphatic polyester resin) is known for a batchwise washing operation, the amount of the alkali preliminarily determined in the above-described manner can be supplied at one time into a washing vessel, to which the laminate shaped product is supplied; or an additional amount of alkali (and water) may be added to raise the alkalinity which has been lowered due to the progress of the washing, thereby suppressing the amount of the washing liquid and accordingly the capacity of the washing vessel without causing an increase of the initial alkali concentration.

In the case where it is difficult to know the necessary amount of alkali in advance, e.g., a case where the amount of the aliphatic polyester resin in the laminate shaped product to be washed is not known, or a case of continuous washing of the aliphatic polyester resin of which the supply amount varies with time, an additional amount of alkali (and water) may be added as required while confirming a pH of ca. 9-14 through pH control of the washing liquid during the washing. For the purpose of effective removal of soil, it is possible to have the alkaline water washing liquid contain a surfactant. As the surfactant, it is possible to preferably use either an anionic surfactant, such as LAS (linear alkylbenzene sulfonate salt), or a nonionic surfactant, such as "Triton X-100") (octophenol-polyethylene glycol ether). In the case of incorporating a surfactant in the alkaline washing liquid, the concentration thereof may suitably be on the order of 0.5-50 g/liter.

(Waste Liquid Disposal)

The washing waste liquid formed by washing with alkaline water, etc., containing aliphatic acid resulting from hydrolysis of the aliphatic polyester resin can possibly be discharged as it is after neutralization since aliphatic acid is an organic acid occurring in nature but may preferably be subjected to an activated sludge treatment to biologically decompose the aliphatic acid into $H_2O$ and $CO_2$, thereby alleviating the load to the ecological system. The activated sludge treatment is a step also contained in the conventional PET bottle recycling system, and the bottle recycling method according to the present invention can be practiced without new equipment investment and only with a slight increase in the load of the activated sludge treatment.

(Coloring)

As a preferred embodiment of the present invention, it is preferred that the aliphatic polyester resin layer is colored. In this case, a colored bottle is obtained and can suppress photodegradation, etc., of the content material by controlling the transmission of light rays. The aliphatic polyester resin layer may be uniformly colored but an arbitrary pattern of colored layer can be disposed thereover to provide an increased aesthetic design effect. The colorant may be selected from any known ones to develop a desired color but, in view of load to the environment after the recycling, it is preferred to use a biodegradable dye or pigment, e.g., edible red dye for coloring in red.

Another advantage accompanying the coloring of the aliphatic polyester resin layer is that it allows the determination of the condition, such as the number and time, of washing for the recycling through eye observation. More specifically, the remaining of aliphatic polyester resin results in the remaining of solid colored resin, thus allowing easy judgment of incomplete separation of the aliphatic polyester resin. As a result, the quality control of the recovered principal resin after the recycling can be remarkably simplified. Particularly, the presence of a colored resin layer has made difficult the separation of the resins for the recycling to provide an obstacle factor in the recycling, but this is utterly contrary in case of the recycling method of the present invention.

Hereinbelow, some Experimental Examples will be shown as reference data for evaluating the effectiveness of the method of recycling a laminate shaped product according to the present invention.

Experimental Example 1

PET (I.V.=0.8) and PGA (melt viscosity=1500 Pa·s at 240° C. and 100/s) were fed separately to an injection molding machine equipped with two cylinders to form a preform with three layers of PET/PGA/PET, which was then formed into a bottle (having a total thickness at the body of 275 μm including respective layer thicknesses from the outer side of 125/25/125) by means of a blow molding machine.

The thus-formed bottle was cut into 2 cm-square pieces and stored in an environment of 80° C. and 95% RH for 18 hours. Some PGA (layers) were taken out of the broken pieces to measure a moisture content by a Karl-Fischer moisture content meter, whereby it exhibited 1.2 wt. %.

The broken bottle pieces were washed for 15 minutes with a 1.5%-caustic soda aqueous solution at 85° C. containing 1.5 equivalents of caustic soda with respect to PGA. The pieces were separated by filtration, washed with water and dried to obtain a solid recovered resin.

In order to measure the remaining amount of PGA, the recovered resin was immersed for 2 hours in a 5%-caustic aqueous solution at 85° C. From the infrared absorption spectrum, only the absorptions attributable to PET were observed, and no glycolic acid was detected in the 5%-caustic soda solution.

Experimental Example 2

A bottle immediately after the preparation in the same manner as in Experimental Example 1 was broken into 2 cm-square pieces, and some PGA (layers) were taken out therefrom to measure a moisture content by means of a Karl-Fischer meter, whereby 0.2 wt. % was exhibited.

The broken bottle pieces were washed for 15 minutes with a 1.5%-caustic soda aqueous solution at 85° C. similarly as in Experimental Example 1. The pieces were separated by filtration, washed with water and dried to obtain a solid recovered resin.

In order to measure the remaining amount of PGA, the recovered resin was immersed for 2 hours in a 5%-caustic aqueous solution at 85° C. Glycolic acid was recognized in the 5%-caustic acid solution, and the amount of PGA calculated based on the glycolic acid showed that ca. 2% of PGA in the shaped bottle remained after the washing.

Experimental Example 3

A bottle immediately after the preparation in the same manner as in Experimental Example 1 was broken into 2 cm-square pieces and were immersed for 36 hours in warm water at 60° C. Some PGA (layers) were taken out from the broken pieces measure a moisture content by means of a Karl-Fischer meter, whereby 1.5 wt. % was exhibited.

The broken bottle pieces were washed for 15 minutes with a 1.5%-caustic soda aqueous solution at 85° C. similarly as in Experimental Example 1. The pieces were separated by filtration, washed with water and dried to obtain a solid recovered resin.

No glycolic acid was detected from the recovered resin.

INDUSTRIAL APPLICABILITY

As described above, according to the method of recovering a laminate shaped product including an aliphatic polyester resin layer in addition to a principal resin layer of the present invention, it becomes possible to rationalize an entire process of recovering the principal resin, e.g., PET in a laminate shaped product, such as a bottle by introducing a simple step of once placing broken pieces of the laminate shaped product in a moisturizing environment to moisturize the aliphatic polyester resin layer, thereby shortening an induction period of an alkaline water washing step that is a principal step for recovery of the principal resin.

The invention claimed is:

1. A method of recycling a laminate shaped product, comprising the steps of:
   breaking a shaped product having a laminate structure including at least one layer of aliphatic polyester resin in addition to a principal resin layer,
   storing resultant broken pieces in a moisturizing environment to adjust a moisture content of the aliphatic polyester resin layer to at least 0.5 wt. %, and then
   washing the broken pieces with alkaline water to remove the aliphatic polyester resin layer by complete dissolution through hydrolysis thereof, thereby recovering the principal resin.

2. The method according to claim 1, wherein the moisture content of the aliphatic polyester resin layer is adjusted to at least 1 wt. % prior to the step of washing with alkaline water.

3. The method according to claim 1, wherein the storing in the moisturizing environment is performed by immersion in water.

4. The method according to claim 1, wherein the broken pieces are washed with a 1-3 wt. % aqueous caustic soda solution at 70-98° C.

5. The method according to claim 1, wherein the broken pieces are washed with a 1-3 wt. % aqueous caustic soda solution at 70-90° C.

6. The method according to claim 1, wherein the broken pieces are washed with alkaline water containing at least 1 equivalent with respect to the aliphatic polyester resin in the broken pieces.

7. The method according to claim 1, wherein the alkaline water further comprises a surfactant.

8. The method according to claim 1, wherein the aliphatic polyester resin comprises a glycolic acid polymer.

9. The method according to claim 1, wherein the principal resin is a PET resin.

10. The method according to claim 1, wherein the laminate shaped product has a structure including the principal resin layer, the aliphatic polyester resin layer and an additional principal resin layer laminated in this order.

11. The method according to claim 1, wherein the aliphatic polyester resin layer is colored, and the washing step is terminated by confirming removal of the solid colored resin from the broken pieces.

* * * * *